(12) United States Patent
Delair et al.

(10) Patent No.: US 7,080,565 B2
(45) Date of Patent: Jul. 25, 2006

(54) DYNAMIC LOAD FIXTURE FOR ROTARY MECHANICAL SYSTEMS

(75) Inventors: Charles M. Delair, Pomerene, AZ (US); Russell B. Cline, Tucson, AZ (US); Christopher P. Owan, Tucson, AZ (US); Jason M. Bain, Vail, AZ (US); Shane P. Stilson, Tucson, AZ (US); Donald E. Croft, Tucson, AZ (US)

(73) Assignee: Raytheon Company, Waltham, MA (US)

( * ) Notice: Subject to any disclaimer, the term of this patent is extended or adjusted under 35 U.S.C. 154(b) by 73 days.

(21) Appl. No.: 10/955,026

(22) Filed: Sep. 29, 2004

(65) Prior Publication Data

US 2006/0070461 A1    Apr. 6, 2006

(51) Int. Cl.
*G01L 3/14* (2006.01)
(52) U.S. Cl. .................................. 73/862.325
(58) Field of Classification Search ........... 73/862.325, 73/847, 862.49
See application file for complete search history.

(56) References Cited

U.S. PATENT DOCUMENTS

| | | | | |
|---|---|---|---|---|
| 4,283,957 A | * | 8/1981 | Zobrist et al. ................ 73/814 |
| 4,414,854 A | * | 11/1983 | Haeg ............................ 73/847 |
| 4,841,810 A | * | 6/1989 | Lew ............................. 475/165 |
| 4,866,362 A | * | 9/1989 | Parker et al. ................ 700/259 |
| 5,107,080 A | * | 4/1992 | Rosen ........................ 200/6 A |
| 5,133,211 A | * | 7/1992 | Brown et al. .............. 73/118.1 |
| 5,247,839 A | * | 9/1993 | Okutani et al. ......... 73/862.326 |
| 6,938,500 B1 | * | 9/2005 | Beaman et al. .......... 73/862.49 |
| 6,941,822 B1 | * | 9/2005 | Yao ........................ 73/862.325 |

* cited by examiner

*Primary Examiner*—Edward Lefkowitz
*Assistant Examiner*—George P. Bonanto
(74) *Attorney, Agent, or Firm*—Thomas J. Finn, Esq.; John E. Gunther; Karl A. Vick, Esq.

(57) ABSTRACT

A dynamic load fixture (DLF) for testing a unit under test (UUT) includes a lateral load system that applies a time-varying lateral load profile to the UUT drive shaft and an encoder that measures its angular rotation. An isolation stage suitably constrains the encoder from rotating about the axis while allowing it to move in other directions in which the application of the lateral force induces motion. The lateral load system includes a load bearing around the drive shaft, an actuator that applies a lateral force to the load bearing, a force sensor for measuring the applied lateral force, and a lateral controller for adjusting a command signal to the actuator to implement a lateral load profile. The DLF may also include a torsion load system that applies a time-varying torsion load profile to the drive shaft.

25 Claims, 7 Drawing Sheets

DYNAMIC LOAD FIXTURE FOR ROTARY MECHANICAL SYSTEMS

BACKGROUND OF THE INVENTION

1. Field of the Invention

This invention relates to test fixtures for applying loads to a rotary mechanical system and more specifically to text fixtures for applying a dynamic lateral load and isolating the measurement of the angular displacement of the rotational output under load.

2. Description of the Related Art

The use of rotary mechanical systems to power automobiles, drive robotics, actuate flight control systems on airplanes and missiles and many other mechanical systems is ubiquitous throughout our economy. The use of a motor to rotate a shaft to actuate these various systems is a cost effective and reliable way to convert electrical energy into a mechanical force. In many applications such as found in an automobile, the motor rotates the drive shaft at a high and relatively constant rate. Therefore, the shaft has a large range of motion but a relatively small frequency content. In other applications such as found in an airplane, the motor rotates the drive shaft over a small range of motion, less than ten turns or even a single turn, to actuate flight control. In applications such as found in a missile, the motor rotates the drive shaft over a small range of motion but at a very high rate to control the position of the fins, canards or wings to guide the missile.

The different applications and environments produce a wide range of load conditions for the rotary mechanical systems. Before a design can be approved or, in some cases, a particular system fielded, it must be tested to determine how the system performs under certain load conditions. More specifically, when a torque is applied to the shaft how does the system respond? When a lateral load is applied to the shaft with and without torque how does the system respond?

Figure 1:
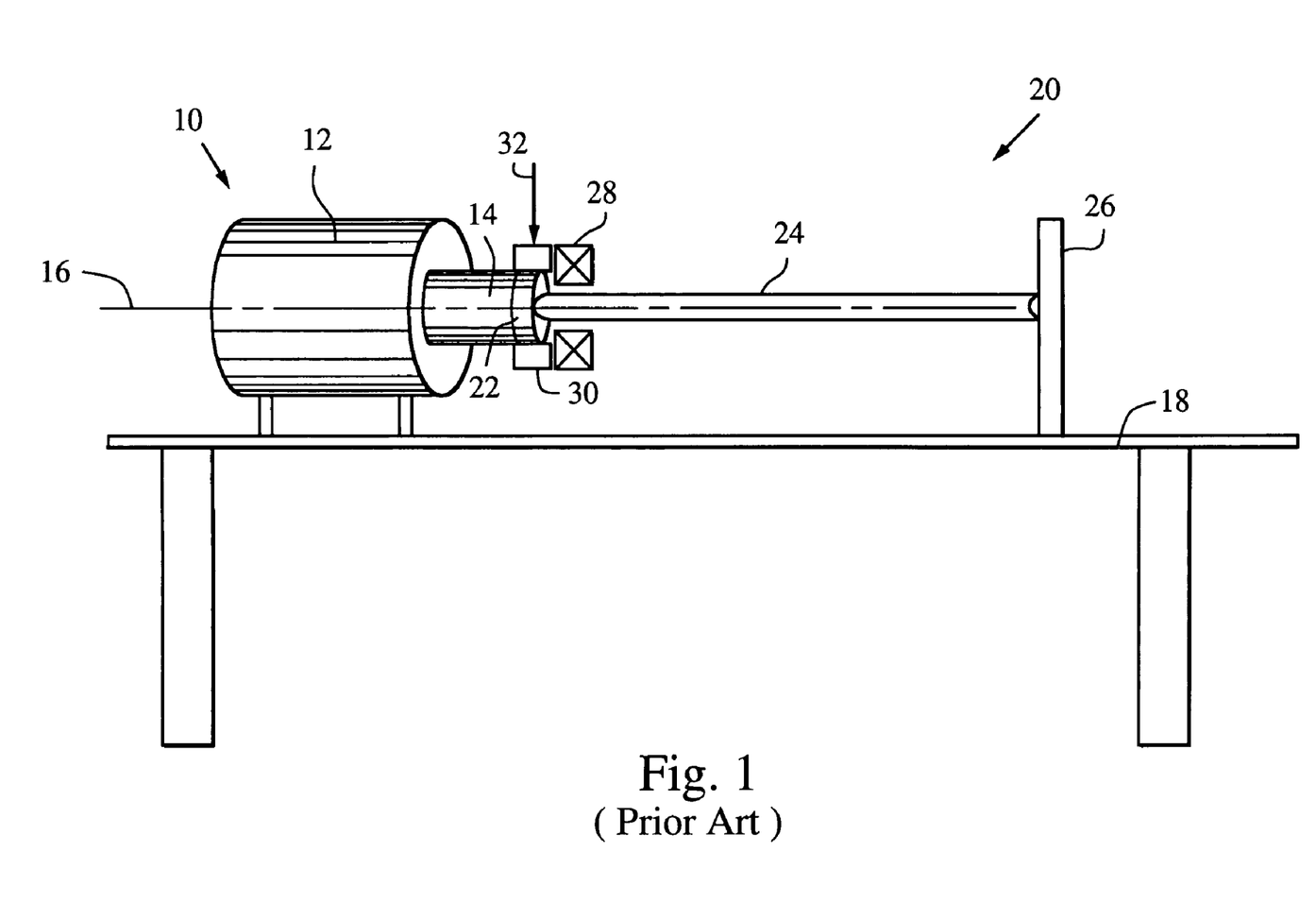
FIG. 1, as described above, is a known test fixture for applying a static lateral load and a linear torsion load to a rotary mechanical system.

Conventional techniques for testing control actuation systems (CAS) used for steering control of guided missiles and flight vehicles typically employ fixed end torsion bars to simulate aerodynamic loads encountered in flight. As shown in FIG. 1, a CAS 10, referred to as a unit under test (UUT) during testing, includes an actuator 12 such as a motor and a drive shaft 14 that rotates about an axis 16 and rests on test bench 18. A conventional test fixture 20 includes an interface bracket 22 that is bolted to the end of drive shaft 14, a torsion bar 24 that is rigidly mounted on the interface bracket along axis 16, and a plate 26 that fixes the other end of the torsion bar to a mechanical ground. An encoder 28 (rotational sensor) measures the angular rotation of the torsion bar when the UUT is activated. The amount of torque in the torsion bar, hence the load applied to the UUT is proportional to the angle of rotation. Alternately, a torque sensor may be placed in-line between the torsion bar and drive shaft.

This approach limits the evaluation to linear load application and prohibits testing of the CAS under desired acceptance test procedures and realistic load environments demanded of typical flight scenarios. Specifically, a "torque at rate" test procedure requires the application of a constant torque load for a constant rotation rate of the drive shaft. Typical flight scenarios produce rapidly changing nonlinear load conditions. Clearly a fixed end torsion bar cannot replicate these conditions. To test the UUT over a range of load conditions albeit quasi-static an operator must replace the torsion bar with a different torsion bar having different stiffness properties. This is very inconvenient and slow.

A static lateral load may be applied through a load bearing 30 about the interface bracket 22 or torsion bar 24 via a mechanical actuator 32 such as a ballscrew, jackscrew or hydraulic system. In some cases, a force sensor is used to monitor the applied force and feed it back to a servo motor to maintain the desired static set point load. The bandwidth of such control systems is very low, <1 Hz, and marginally adequate to maintain the desired set point. To test the UUT over a range of static conditions, the operator must reprogram the actuator for each new value once the previous test is completed, which is inconvenient and slow. Furthermore, desired test procedures and actual flight conditions require dynamic time-varying loads, which are not supported by the current testing platforms. Moreover, the application of the lateral load to the shaft may impart a rotation on the encoder relative to the shaft that corrupts the measurement of the rotation angle. Furthermore, the load may be transferred to the encoder potentially damaging it.

SUMMARY OF THE INVENTION

The present invention provides a dynamic load fixture (DLF) for applying a dynamic lateral load and simultaneously applying dynamic torsion and lateral loads to a rotary mechanical system.

This is accomplished with an actuator that applies a programmable time-varying lateral force to the load bearing, which is transferred to the shaft. A force sensor senses the lateral force and feeds it back to a controller, which adjusts the command signal to the actuator to create the desired dynamic load profile. The control loop has a sufficiently high bandwidth, suitably >10 Hz, to implement desired test procedures and simulations of real-world flight conditions. An encoder measures the angular rotation of the shaft to record the performance of the UUT. Torque can be measured by this encoder, a torque sensor, or a pair of encoders depending on the test setup.

The application of a lateral load to the rotating shaft can produce forces that move the shaft in different directions. The induced motion can affect the accuracy of the encoder measurement and may damage the encoder or the torsion bar. The encoder. is suitably mounted on an isolation stage that constrains the encoder from rotating about the axis while allowing it to move in other directions in which the application of the lateral force induces motion. This preserves the accuracy of the encoder measurement and prevents the encoder from being damaged. The isolation stage includes a combination of linear and vertical slides and rotation bearings. A pair of flex couplings is suitably provided at either end of the torsion bar so that the lateral load is effectively transferred to the UUT without inducing a curvature in the torsion bar.

In one embodiment, the actuator comprises a linear actuator that deflects a leaf spring producing torque in a rotary output shaft. The torque is converted to a lateral load via a pivot point to push a bar against the load bearing. Different leaf springs are used to achieve different lateral load ranges for a given linear actuator and to achieve precise loads for the appropriate load range.

In another embodiment, the actuator comprises a rotary motor and gearbox that rotate an output shaft along an axis parallel to the axis of the UUT's rotational output. Rotation of the output shaft is converted to a lateral force via a pivot point to push a bar against the bearing. Additional gear reduction can be used to transfer the rotation of the first output shaft to a second that produces the lateral force.

The DLF may be configured to apply no torsion load by leaving the opposite end of the torsion bar free to rotate or removing the torsion bar, to simultaneously apply a torsion load that is proportional to the amount of rotation by fixing the end of the torsion bar, or to simultaneously apply a dynamic torsion load. In the latter case, a motor applies torque to the free end of the torsion bar. Closed loop control is used to measure the applied torque and adjust the motor control. This approach allows the DLF to dynamically control both the torsion and lateral loads to more effectively reproduce desired acceptance tests such as torque-at-rate and real life conditions via nonlinear loads with a high response bandwidth.

These and other features and advantages of the invention will be apparent to those skilled in the art from the following detailed description of preferred embodiments, taken together with the accompanying drawings, in which:

DETAILED DESCRIPTION OF THE INVENTION

The present invention provides a dynamic load fixture (DLF) for applying a programmable time-varying lateral load to a rotary mechanical system and isolating the measurement of the angular displacement of its rotational output under load. Although the DLF may be configured to apply no torsion load by leaving the opposite end of the torsion bar free to rotate or removing the torsion bar, or to apply a torsion load that is proportional to the amount of rotation by fixing the end of the torsion bar, the DLF will be described in a configuration in which both dynamic lateral and torsion loads are applied. This configuration allows the DLF to more effectively reproduce desired acceptance tests and real life conditions.

Figure 2A:
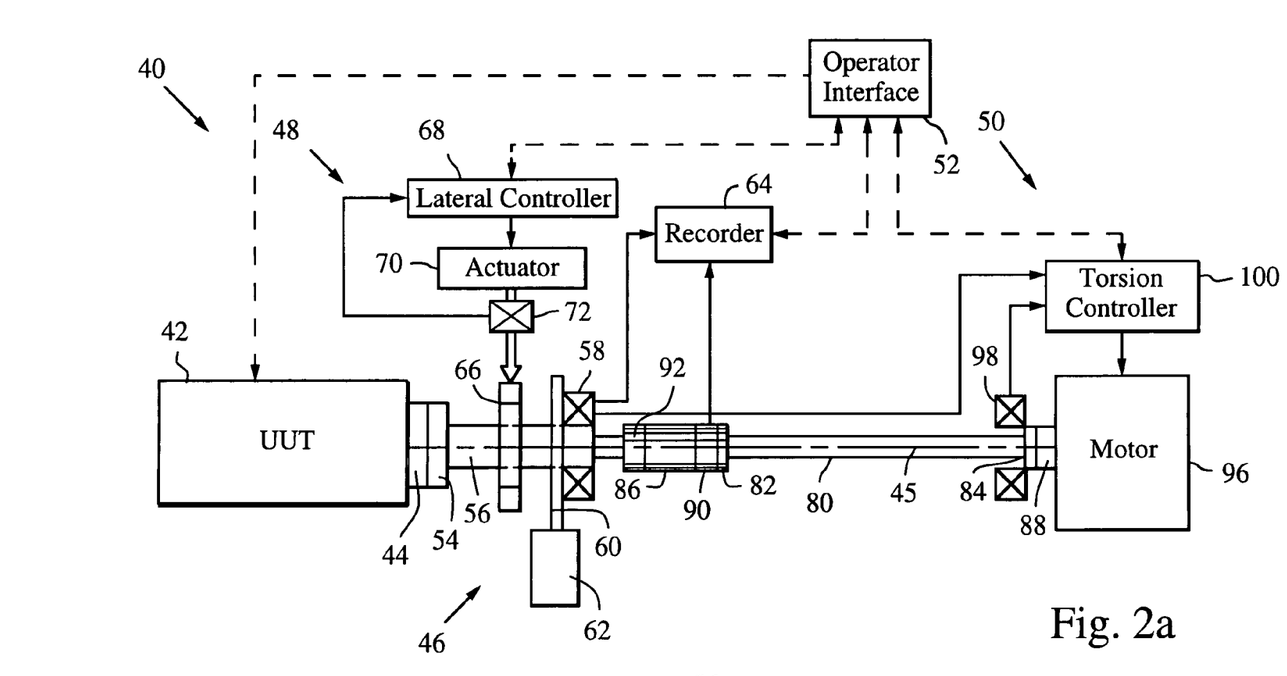
FIGS. 2a and 2b are top and end section diagrams of a dynamic load fixture (DLF) for applying a dynamic lateral and torsion loads to a rotary mechanical system in accordance with the present invention.
Figure 2B:
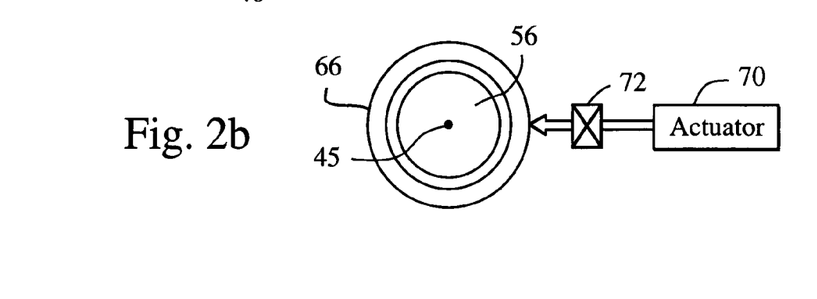

As shown in FIGS. 2a and 2b, a dynamic load fixture (DLF) 40 is configured for testing a unit under test (UUT) 42 having a drive shaft 44 that rotates about an x-axis 45 ("roll"). The DLF comprises an encoder system 46 that measures the angular rotation of the drive shaft, a lateral load system 48 that applies a time-varying lateral load profile to the drive shaft and a torsion load system 50 that applies a time-varying torsion load profile to the drive shaft. An operator provides the load profiles and a UUT operating profile via an operator interface 52 and records and monitors the test results.

The encoder system 46 includes a UUT adapter 54 that bolts an encoder mounting shaft 56 to the UUT's drive shaft 44. An encoder 58 (rotational sensor) is mounted on an encoder mounting plate 60 around shaft 56 to measure the angular rotation of the shaft. In the DLF, the encoder mounting shaft 56 is far less constrained than a drive shaft in a normal implementation in order to apply the lateral load and monitor its effect. Therefore the encoder needs to be able to "float" around in space, but not be allowed to move with respect to the encoder mounting shaft it is measuring. The encoder mounting plate 60 is suitably mounted on an isolation stage 62 that constrains the encoder 58 from rotating about the x-axis 45 while allowing it to move in other directions in which the application of the lateral force induces motion. This preserves the accuracy of the encoder measurement and prevents the encoder from being damaged. The encoder transmits the rotation data to a recorder 64 that records the data for comparison to a UUT operating profile, e.g. did the UUT perform as programmed.

The lateral load system 48 includes a load bearing 66 that allows the encoder mounting shaft 56 to rotate freely about the x-axis 45 even under load. A lateral controller 68 provides a lateral command signal to an actuator 70, which in turn produces a linear force on load bearing 66 that is transferred to encoder mounting shaft 56. A force sensor 72, typically mounted in-line between the actuator and the load bearing, senses the lateral force and feeds it back to controller 68, which adjusts the command signal to the actuator 70 to create the desired lateral load profile.

Figure 3A:
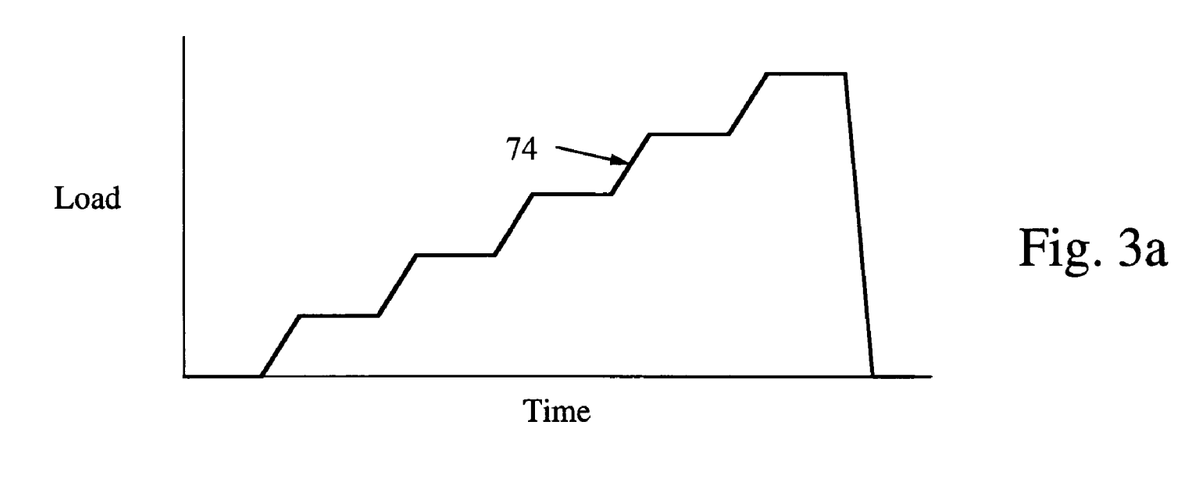
FIGS. 3a and 3b are examples of time-varying lateral load profiles that can be generated using the DLF.
Figure 3B:
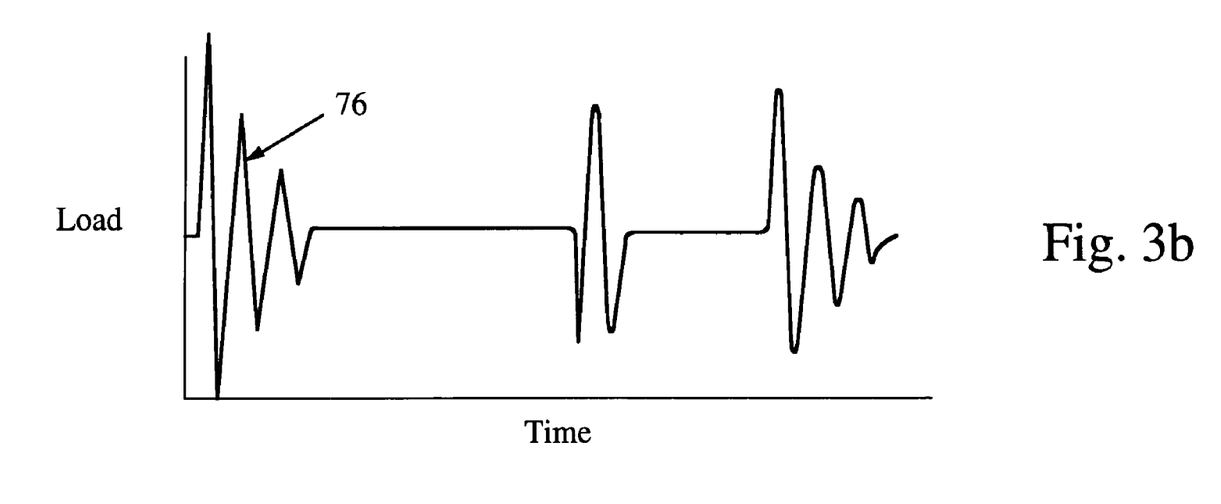
Figure 6:
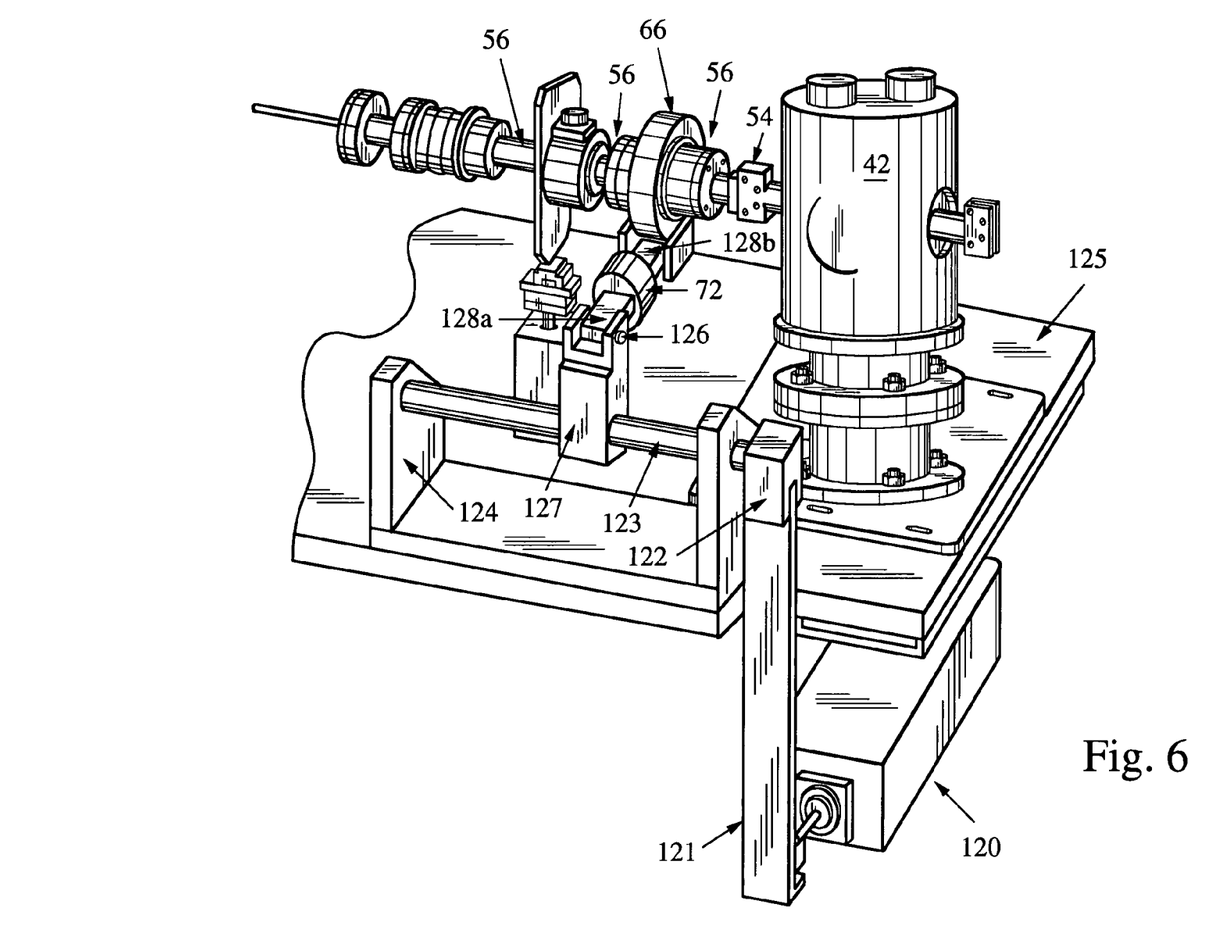
FIG. 6 is a perspective view of an actuator for applying a dynamic lateral load.
Figure 7:
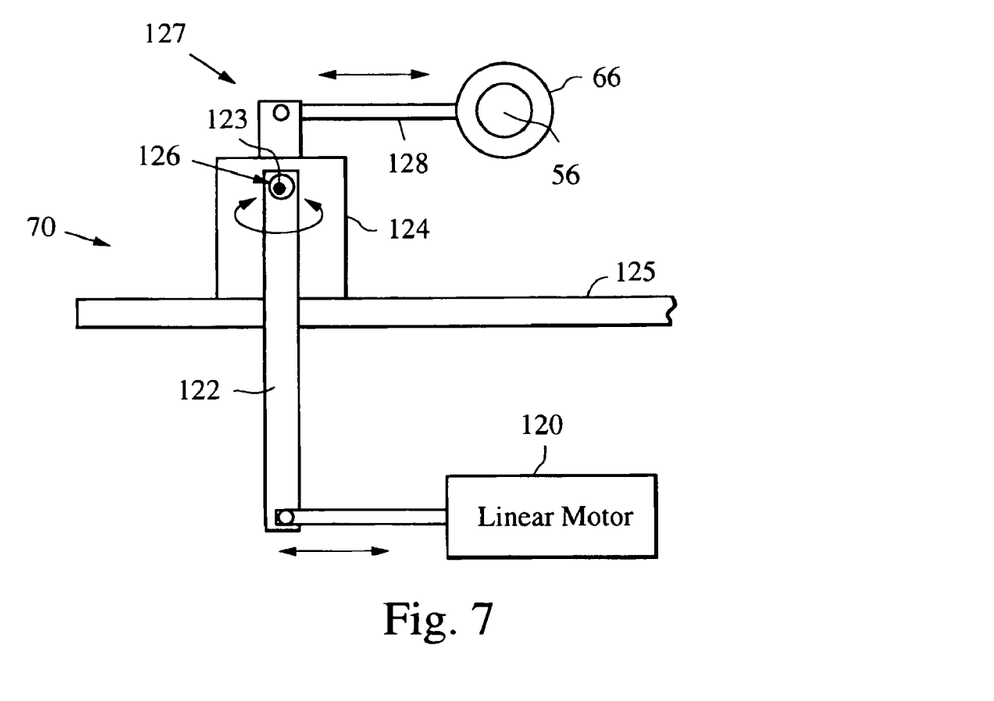
FIG. 7 is a mechanical schematic of the actuator.
Figure 8:
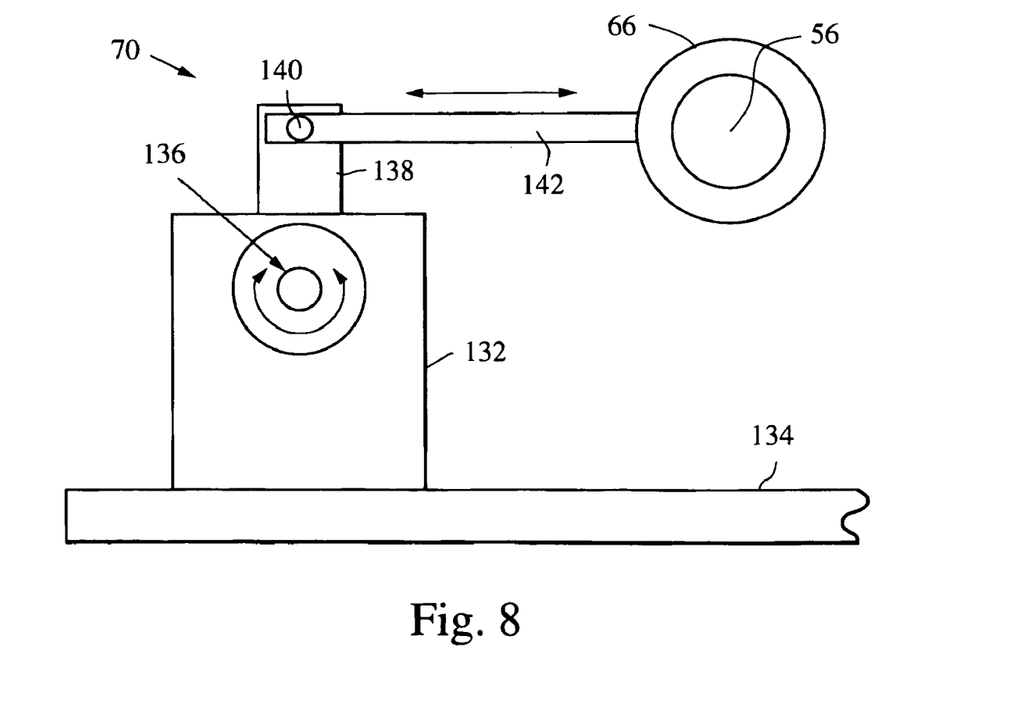
FIG. 8 is a mechanical schematic of an alternate actuator.

An operator may select, download or create a desired lateral load profile that is used to program the lateral controller 68. As shown in FIG. 3a, a staircase load profile 74 applies a static load condition for a specified amount of time and then increments the load. This allows the operator to run a wide range of tests very efficiently without any further interaction and to record the results. As shown in FIG. 3b, a load profile 76 is a continuously time varying plot that simulates one possible real-flight maneuver for an aerodynamic vehicle. There are three regions of dynamic loading and then two regions of relatively minimal loading between them. The three oscillatory regions represent the missile trajectory corrections made immediately after launch, somewhere in mid-flight, and just prior to flight termination. The lower level loading between these regions is indicative of the lower panel loads observed during the cruise portions of a flight. To implement these and other types of time-varying load profiles, the lateral load system 48 must have sufficient bandwidth, suitably >10 Hz, to accurately control the lateral force applied to the bearing 66 in the face of changing UUT operating conditions and/or changing torsion loads. Conventional servo controllers such as PID feedback and phase lead controllers can provide adequate bandwidth. Suitable actuators are illustrated in FIGS. 6–8 below.

The torsion load system 50 comprises a torsion bar 80 provided with interface brackets 82 and 84 at opposing ends. When used in conjunction with the lateral load system, a pair of flex couplings 86 and 88 are bolted to the respective interface brackets 82 and 84 so that the lateral load is effectively transferred to the encoder mounting shaft 56 allowing it to deflect laterally without inducing a curvature in the torsion bar. Both the encoder mounting shaft 56 and flex couplings have a torsion stiffness that is much higher than that of the torsion bar. Interface bracket 82 is mechanically coupled to the encoder mounting shaft 56 via an optional torque sensor 90 and another interface bracket 92 that is bolted to the encoder mounting shaft 56. The torque sensor measures the torque in the drive shaft assembly and sends it to recorder 64. Although the deflection angles will vary along the length of the shaft assembly, the torque will remain constant so the torque sensor can be placed anywhere in the assembly.

The other end of torsion bar 80 is coupled to a motor 96 via bracket 84 and flex coupling 88. The motor applies torque to the torsion bar 80 to apply a time-varying torsion load to drive shaft 44. Although not shown in this embodiment, a gear train may be used to increase the maximum torque applied by the specific motor used to a specific torque range of UUT. The gear train uses a pinion spur gear on the motor output shaft interfacing to an output spur gear attached to the end of the torsion bar shaft 80.

Sensors measure the angular rotation of, and the torque applied to, the drive shaft 44. One rotary sensor is typically placed around the encoder mounting shaft 56. In this embodiment, the encoder 58 provides this function. The other rotary sensor 98 is suitably placed towards the other end of the torsion bar 80 near the motor 96. The measurement data is fed back to a controller 100 that generates a command signal to the motor 96 to adjust the application of torque to the torsion bar 80 so that the actual measured torsion load closely approximates the load command (profile).

To achieve the demanding aerodynamic load exposures encountered by a CAS in flight, the torsion controller 100 must be able to respond both very fast and very precisely and must have a greater bandwidth than the lateral controller. Conventional servo controllers such as PID feedback and phase lead controllers although adequate for certain test conditions do not provide optimum response. Control is enhanced by the thorough characterization of the DLF and application of either "classic" negative feedback control or "modern" state-space control methods of linear observers and quadratic optimum control. In addition, the UUT itself can be characterized and modeled and incorporated either in a separate feed forward control $G_{FF}$ with phase lead compensation $G_C$ ("classic") or in the state-space controller $G_{SS}$ with the UUT states included in the characteristic equations. This allows the controller to anticipate and thereby correct for the response of the UUT to an applied torque, which in turn greatly enhances the effective bandwidth of the controller 100. A complete explanation of the torsion control system is provided in copending patent application entitled "Dynamic Load Fixture for Application of Torsion Loads for Rotary Mechanical Systems" filed on Sep. 29, 2004, which is hereby incorporated by reference.

Figure 4:
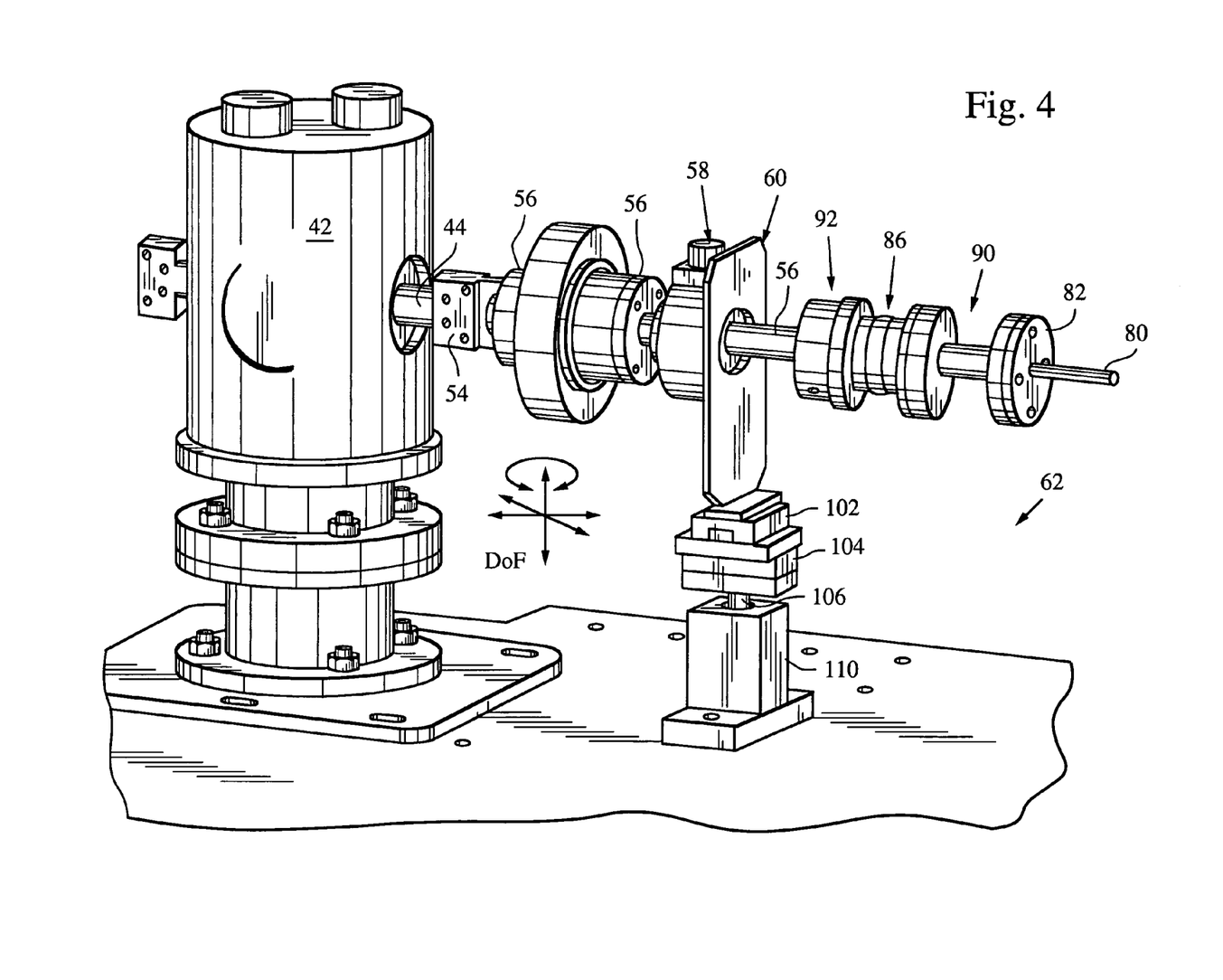
FIG. 4 is a perspective view of the isolation stage of the DLF.
Figure 5:
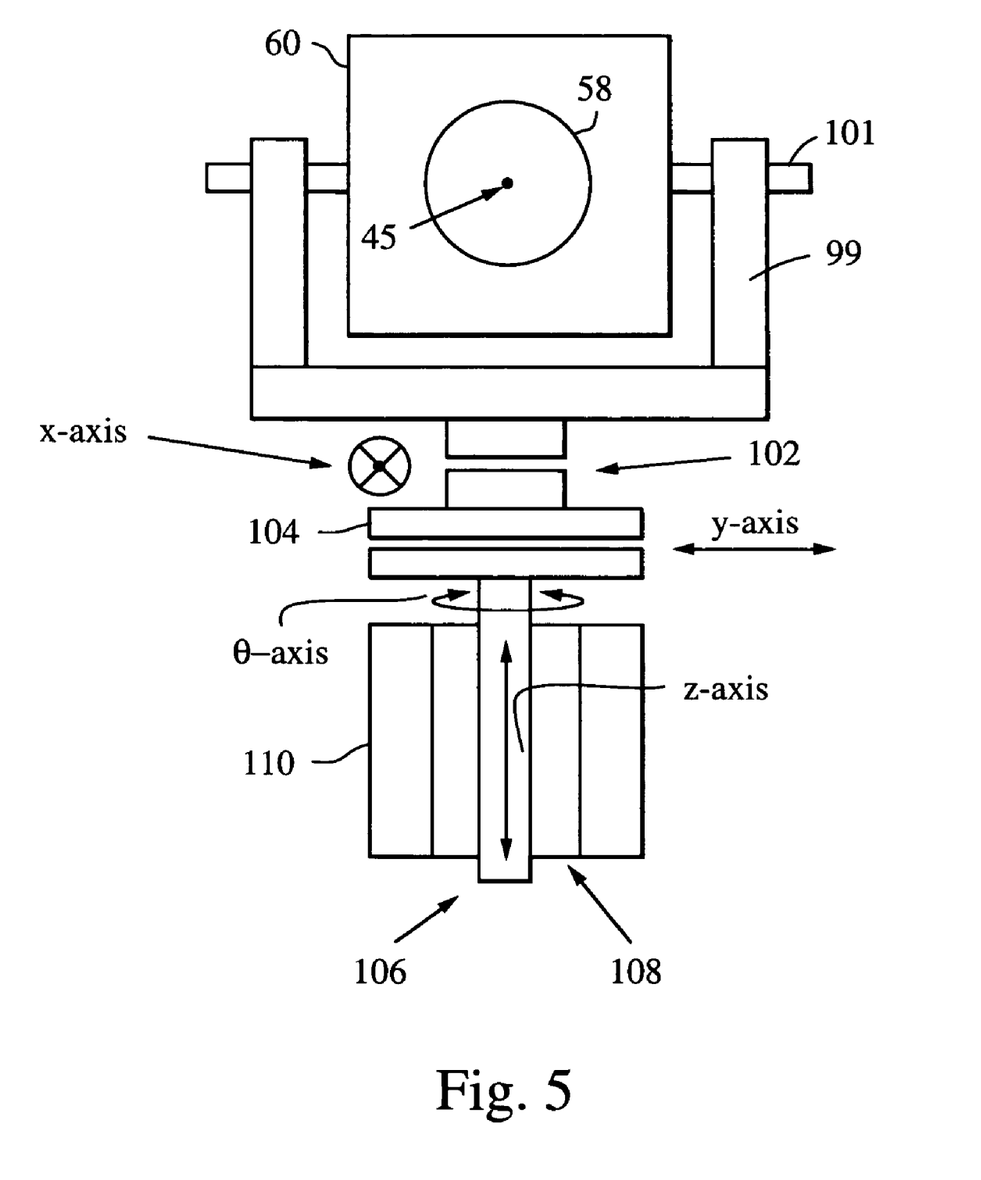
FIG. 5 is a mechanical schematic of the isolation stage in the DLF.

As shown in FIGS. 4 and 5, isolation stage 62 comprises a combination of linear and vertical slides and rotation bearings to isolate angular rotation ("roll") around the x-axis while allowing low friction motion in the directions that the lateral load induces forces. Encoder mounting plate 60 constrains the encoder 58 from rotating about the x-axis 45 thereby preserving the measurement accuracy of the rotation angle of the shaft. As shown only in FIG. 5, the mounting plate is preferably coupled to a yoke 99 through a bearing(s) 101 allowing the mounting plate to pitch about the y-axis. The yoke is attached to linear bearing 102 that allows movement along the y-axis, which in turn is mounted on a linear bearing 104 that allows movement along the x-axis. This assembly is mounted on a shaft 106 that rides in a bearing 108 within a grounded housing 110 that allows movement along the z-axis and rotation ("yaw") around the z-axis. The encoder moves freely in all five degrees of freedom, which prevents the lateral load from being transferred to the encoder. By managing the inertia and stiffness of the sliders and bearings it is possible to place the natural frequency of the system outside the spectrum of the noise. This allows for a system that isolates the desired rotation, eliminates errors due to loading and applies minimum stress on the encoder. Other combinations of slides and bearings can be configured to define an isolation stage that provides the necessary constraints and freedom of movement.

The actuator 70 is preferably configured to provide a wide range of lateral forces, precisely and with sufficient bandwidth to implement the programmed lateral load profile. As shown in FIGS. 6 and 7, the actuator 70 comprises a linear actuator 120 that deflects a leaf spring 121 in a single degree of freedom, i.e., rotation around the x-axis or "roll". The leaf spring rotates about the end opposite the linear actuator and is clamped via clamp 122 to a rotary output shaft 123, which is supported by a lateral load structure 124 on the test bench 125. The torque in output shaft 123 is converted to a lateral force along the y-axis via a pivot point 126 and clamp 127 to push a bar 128 against the load bearing 66, which in turn pushes on the encoder mounting shaft 56. Different leaf springs 122 with varying thicknesses are used to achieve different lateral load ranges for a given linear motor and to achieve precise loads for the appropriate load range. The leaf springs can be exchanged quickly and easily. Bar 128 may comprise a couple segments 128a and 128b as shown in FIG. 6 with the force sensor 72 inserted between the segments to measure the lateral force. A desired lateral load profile is fed to the linear actuator 120 and controlled via the feedback of the force sensor 72.

As shown in FIG. 8, the actuator 70 comprises a rotary motor and gearbox 132 on the test bench 134 that rotate a load shaft 136 along an axis parallel to the x-axis 45. Rotation of the load shaft 136 is converted to a lateral load via an output link 138 and pivot point 140 to push a bar 142 against the bearing 66, which in turn pushes on the encoder mounting shaft 56. Additional gear reduction can be used to transfer the rotation of the load shaft 136 to a second load shaft to which the output link 138 is connected to achieve larger loads. Similar to above, the bar may be broken into segments with the force sensor inserted in-line to measure the applied force.

While several illustrative embodiments of the invention have been shown and described, numerous variations and alternate embodiments will occur to those skilled in the art. Such variations and alternate embodiments are contemplated, and can be made without departing from the spirit and scope of the invention as defined in the appended claims.

We claim:

1. A dynamic load fixture (DLF) for testing a unit under test (UUT) having a drive shaft that rotates about an axis, comprising:

an encoder mounting shaft that is coupled to the drive shaft to rotate about said axis;

a load bearing that allows the encoder mounting shaft to rotate freely about the axis;

an encoder that measures angular rotation of the encoder mounting shaft;

an actuator that applies a lateral force to the load bearing;

a force sensor that senses the lateral force applied to the load bearing; and a lateral controller that monitors the sensed lateral force and controls the actuator with a control system bandwidth of at least 10 Hz to apply a desired time-varying lateral load profile.

2. The DLF of claim 1, further comprising:
an isolation stage that constrains the encoder from rotating about the axis while allowing the encoder to move freely in directions in which the lateral force induces motion.

3. The DLF of claim 2, wherein in a coordinate system with x, y and z mutually orthogonal axes, said drive shaft and said encoder mounting shaft rotating about said x-axis, said isolation stage constrains the encoder from rotating about the x-axis and allows the encoder to move along at least the y and z axes.

4. The DLF of claim 3, wherein the isolation stage comprises:
a yoke and bearing that allows rotation around the y-axis;
a first linear slider that allows movement along the x-axis;
a second linear slider that allows movement along the y-axis; and
a bearing housing and shaft that allow movement along and rotation around the z-axis.

5. The DLF of claim 1, wherein the time-varying lateral load profile applies a static load condition for a specified amount of time and then increments the load.

6. The DLF of claim 1, wherein the time-varying lateral load profile applies a simulation of flight conditions for the UUT.

7. The DLF of claim 1, further comprising an operator interface for selecting the time-varying lateral load profile.

8. The DLF of claim 1, further comprising:
a torsion bar adapted for mechanical coupling to the encoder mounting shaft along the axis of rotation, said torsion bar having a torsion stiffness that is much less than that of said encoder mounting shaft,
a torsion motor for applying torque to the torsion bar;
a sensor for measuring torque applied to the encoder mounting shaft; and
a torsion controller receiving as inputs a time-varying load command and the measured torque and generating a command signal to the torsion motor to adjust the application of torque to the torsion bar so that the torque applied to the encoder mounting shaft approximates the time-varying load command.

9. The DLF of claim 8, wherein the torsion motor is capable of applying torque to the torsion bar so that torque applied to the encoder mounting shaft is independent of the angular rotation of the encoder mounting shaft.

10. The DLF of claim 9, wherein the torsion motor applies torque to the torsion bar to produce an approximately constant torque on the encoder mounting shaft at a given rate of rotation.

11. The DLF of claim 9, wherein the motor applies torque to the torsion bar to produce a non-linear torque on the encoder mounting shaft.

12. The DLF of claim 8, wherein the torsion controller comprises a state-space controller that incorporates models of the DLF and UUT to anticipate and correct errors in the torsion load caused by the response of the DLF and UUT, respectively, to the load.

13. The DLF of claim 8, wherein said sensor comprises a first rotational sensor that measures a first angular deflection of the encoder mounting shaft at one end of the torsion bar and a second rotational sensor that measures a second angular deflection of the torsion bar at the torsion motor whereby the difference of the first and second angular deflections provides the torque measurement, further comprising an isolation stage that constrains the first sensor from rotating about the axis while allowing the first sensor to move freely in directions in which the lateral-force induces motion.

14. The DLF of claim 8, further comprising a pair of flex couplings at opposite ends of the torsion bar that allow the encoder mounting shaft to deflect laterally without inducing a curvature in the torsion bar.

15. A dynamic load fixture (DLF) for testing a unit under test (UUT) having a drive shaft that rotates about an axis, comprising:
an encoder mounting shaft that is coupled to the drive shaft to rotate about said axis;
a load bearing that allows the encoder mounting shaft to rotate freely about the axis;
an encoder that measures annular rotation of the encoder mounting shaft;
an actuator comprising a linear actuator that deflects a leaf spring causing an output shaft to rotate, and produce torque that is converted to a lateral force that pushes a bar against the load bearing;
a force sensor that senses the lateral force applied to the load bearing; and
a lateral controller that monitors the sensed lateral force and controls the actuator to apply a desired time-varying lateral load profile.

16. The DLF of claim 15, wherein the actuator further comprises a clamp on said output shaft and a pivot point for converting the output shaft torque to the lateral force.

17. A dynamic load fixture (DLF) for testing a unit under test (UUT) having a drive shaft that rotates about an axis, comprising:
an encoder mounting shaft that is coupled to the drive shaft to rotate about said axis;
a load bearing that allows the encoder mounting shaft to rotate freely about the axis;
an encoder that measures angular rotation of the encoder mounting shaft;
an actuator comprising a rotary motor and gearbox that rotate an output shaft along an axis parallel to the axis of the rotating encoder mounting shaft, the rotation of the output shaft producing torque that is converted to a lateral force to push a bar against the bearing;
a force sensor that senses the lateral force applied to the load bearing; and
a lateral controller that monitors the sensed lateral force and controls the actuator to apply a desired time-varying lateral load profile.

18. The DLF of claim 17, wherein the actuator further comprises a clamp on said load shaft and a pivot point for converting the output shaft torque to the lateral force.

19. A dynamic load fixture (DLF) for testing a unit under test (UUT) having a drive shaft that rotates about an X-axis, comprising:
an encoder system including an encoder mounting shaft configured for attachment to said drive shaft for rotation about the X-axis and which is less constrained than the drive shaft to allow some rotation around Y and Z mutually orthogonal axes, an encoder for measuring the angular rotation of the encoder mounting shaft about the X-axis, and an isolation stage that constrains the encoder from rotating about the X-axis while allowing it to move along at least the Y and Z axes in which the application of a lateral load to the encoder mounting shaft would induce motion; and
a lateral load system having a closed-loop control bandwidth of at least 10 Hz that applies a time-varying lateral load profile to the encoder mounting shaft.

20. The DLF of claim 19, wherein the lateral load system includes a load bearing around said encoder mounting shaft, an actuator that applies a lateral force to said load bearing, a force sensor for measuring the applied lateral force, and a lateral controller for adjusting a command signal to the actuator to implement the time-varying lateral load profile.

21. The DLF of claim 19, wherein the isolation stage comprises:
   a mounting plate that constrains the encoder from rotating about the X-axis;
   a yoke and bearing that allows movement around the Y-axis;
   a first linear slider that allows movement along the X-axis;
   a second linear slider that allows movement along the Y-axis; and
   a bearing housing and shaft that allow movement along and rotation around the Z-axis.

22. A dynamic load fixture (DLF) for testing a unit under test (UUT) having a drive shaft that rotates about an axis, comprising:
   a lateral load system that applies a programmable time-varying lateral load profile to the drive shaft through an encoder mounting shaft coupled to the drive shaft;
   a torsion load system that applies a programmable time-varying torsion load profile to the drive shaft through a torsion bar coupled to the mounting shaft, said torsion bar having a torsion stiffness that is much less than the encoder mounting shaft; and
   an encoder system comprising,
      a first rotational sensor that measures a first angular rotation of the encoder mounting shaft at one end of the torsion bar
      an isolation stage that constrains the first rotational sensor from rotating about the axis while allowing the encoder to move freely in directions in which the lateral load induces motion; and
      a second rotation sensor that measures a second angular rotation at the opposite end of the torsion bar,
   said torsion load system using the measurements of the first and second angular rotations to adjust a torque applied to the torsion bar to more closely approximate the time-varying torsion load profile.

23. The DLF of claim 22, wherein the lateral load system includes a lateral controller for adjusting a command signal to an actuator to implement the lateral load profile.

24. The DLF of claim 22, wherein the torsion load system includes a motor for applying torque to the torsion bar.

25. A dynamic load fixture (DLF) for testing a unit under test (UUT) having a drive shaft that rotates about an axis, comprising:
   an encoder mounting shaft configured for attachment to said drive shaft for rotation about the axis;
   a lateral load system having a control bandwidth of at least 10 Hz including a load bearing around said encoder mounting shaft, an actuator that applies a lateral force to said load bearing, a force sensor for measuring the applied lateral force, and a lateral controller for adjusting a command signal to the actuator to implement a desired time-varying lateral load profile;
   a first rotational sensor for measuring a first angular rotation of the encoder mounting shaft to record the performance of the UUT;
   an isolation stage that constrains the first rotational sensor from rotating about the axis while allowing it to move in other directions in which the application of the lateral force induces motion;
   a torsion load system including a torsion bar attached to said encoder mounting shaft and a pair of flex couplings on either end of the torsion bar that allow the encoder mounting shaft to deflect laterally without inducing curvature in the torsion bar, said encoder mounting shaft and said flex couplings having a torsion stiffness that is greater than that of the torsion bar, a motor for applying torque to said torsion bar, a second rotation sensor for measuring a second angular rotation of the torsion bar at the torsion motor, and a torsion controller for calculating an applied torque from a difference between the first and second angular rotations and adjusting a command signal to the torsion motor to implement a time-varying torsion load profile.

* * * * *